US007072494B2

(12) United States Patent
Georgescu et al.

(10) Patent No.: US 7,072,494 B2
(45) Date of Patent: Jul. 4, 2006

(54) METHOD AND SYSTEM FOR MULTI-MODAL COMPONENT-BASED TRACKING OF AN OBJECT USING ROBUST INFORMATION FUSION

(75) Inventors: Bogdan Georgescu, Highland Park, NJ (US); Xiang Sean Zhou, Plainsboro, NJ (US); Dorin Comaniciu, Princeton Jct., NJ (US); R. Bharat Rao, Berwyn, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/058,784

(22) Filed: Feb. 16, 2005

(65) Prior Publication Data

US 2005/0185826 A1 Aug. 25, 2005

Related U.S. Application Data

(60) Provisional application No. 60/546,232, filed on Feb. 20, 2004.

(51) Int. Cl.
*G06K 9/00* (2006.01)
(52) U.S. Cl. ...................................... 382/103; 382/107
(58) Field of Classification Search ................ 382/103, 382/100, 107, 236, 238; 348/143, 155
See application file for complete search history.

(56) References Cited

U.S. PATENT DOCUMENTS 6,301,370 B1 * 10/2001 Steffens et al. ............. 382/103

6,674,877 B1 * 1/2004 Jojic et al. .................. 382/103

FOREIGN PATENT DOCUMENTS

EP          1 318 477       6/2003
WO       WO 01/27875 A1    4/2001

OTHER PUBLICATIONS

Comaniciu ["Robust Information Fusion using Variable-Bandwidth Density Estimation", Information Fusion 2003, Proceeding of the Sixth International Conference, vol. 2, 2003, pp. 1303-1309].*
Cootes et al., "Statistical models of appearance for medical image analysis and computer vision", Proc. SPIE Medical Imaging, 2001, pp. 236-248.
Chalana et al., "A multiple active contour model for cardiac boundary detection on echocardiographic sequences", IEEE Trans. Medical Imaging 15, 1996, pp. 290-298.
Mignotte et al., "Endocardial boundary estimation and tracking in echocardiographic images using deformable templates and markov random fields", Pattern Analysis and Applications 4, 2001, pp. 256-271.

(Continued)

*Primary Examiner*—Duy M. Dang
(74) *Attorney, Agent, or Firm*—Michele L. Conover

(57) ABSTRACT

A system and method for tracking an object is disclosed. A video sequence including a plurality of image frames are received. A sample based representation of object appearance distribution is maintained. An object is divided into one or more components. For each component, its location and uncertainty with respect to the sample based representation are estimated. Variable-Bandwidth Density Based Fusion (VBDF) is applied to each component to determine a most dominant motion. The motion estimate is used to determine the track of the object.

29 Claims, 7 Drawing Sheets

OTHER PUBLICATIONS

Mailloux et al., "Restoration of the velocity field of the heart from two-dimensional echocardiograms", IEEE Trans. Medical Imaging 8, 1989, pp. 143-153.

Adam et al., "Semiautomated border tracking of cine echocardiographic ventricular images", IEEE Trans. Medical Imaging 6, 1987, pp. 266-271.

Baraldi et al., "Evaluation of differential optical flow techniques on synthesized echo images", IEEE Trans. Biomedical Eng, vol. 43, No. 3, Mar. 1996, pp. 259-272.

Jacob et al., "A shape-space-based approach to tracking myocardial borders and quantifying regional left-ventricular function applied in echocardiography", IEEE Trans. Medical Imaging 21, 2002, pp. 226-238.

Roche et al., "Rigid registration of 3D ultrasound with MR images: a new approach combining intensity and gradient information", IEEE Trans. Medical Imaging 20, 2001, pp. 1038-1049.

Montillo et al., "Automated segmentation of the left and right ventricles in 4D cardiac SPAMM images", Proc. Of Medical Image Computing and Computer Assisted Intervention (MICCAI), Tokyo, Japan, 2002, pp. 620-633.

Hellier et al., "Coupling dense and landmark-based approaches for non-rigid registration", IEEE Trans. Medical Imaging 22, 2003, pp. 217-227.

Jacob et al., "Robust contour tracking in echocardiographic sequence", Proc. Int'l Conf. on Computer Vision, Bombay, India, 1998, pp. 408-413.

Blake et al., "Learning to track the visual motion of contours", Artificial Intelligence 78, 1995, pp. 101-133.

Comaniciu, "Nonparametric information fusion for motion estimation", Proc. IEEE Conf. on Computer Vision and Pattern Recognition, Madison, WI, 2003, pp. 59-66.

Comaniciu et al., "Robust real-time myocardial border tracking for echocardiography: an information fusion approach", IEEE Trans Medical Imaging 2004.

Akgul et al, "A coarse-to-fine deformable contour optimization framework", IEEE Trans. Pattern Anal. Machine Intelligence 25, 2003, pp. 174-186.

Mikic et al., "Segmentation and tracking in echocardiographic sequences: Active contours guided by optical flow estimates", IEEE Trans. Medical Imaging 17, 1998, pp. 274-284.

Shi, "Good features to track", IEEE Conf. on Computer Vision and Pattern Recog., San Juan, PR, 1994, pp. 593-600.

Sidenbladh et al., "Stochastic tracking of 3D human figures using 2D image motion", 2000 European Conf. on Computer Vision, vol. 2, Dublin, Ireland, 2000, pp. 702-718.

Black et al., "Eigentracking: robust matching and tracking of articulated objects using a view-based representation", Int'l J. of Computer Vision 26, 1998, pp. 63-84.

Edwards et al., "Face recognition using active appearance models", 1998 European Conf. on Computer Vision, Freiburg, Germany, 1998, pp. 581-595.

Jepson et al., "Robust online appearance models for visual tracking", IEEE Trans. Pattern Anal. Machine Intelligence 25, 2003, pp. 1296-1311.

Stauffer et al., "Adaptive background mixture models for real-time tracking", 1999 IEEE Conf. on Computer Vision and Pattern Recog, vol. 2, 1999, pp. 246-252.

Tao et al., "Dynamic layer representation with application to tracking", 2000 IEEE Conf. on Computer Vision and Pattern Recog., vol. 2, 2000, pp. 134-141.

Freeman et al., "The design and use of steerable filters", IEEE Trans. Pattern Anal. Machine Intelligence 13, 1991, pp. 891-906.

Collins et al., "On-line selection of discriminative tracking features", 2000 Int'l Conf. on Computer Vision, 2003.

Krahnstoever et al., "Robust probabilistic estimation of uncertain appearance for model based tracking", IEEE Workshop on Motion and Video Computing, 2002.

Krahnstoever et al., "Appearance management and cue fusion for 3D model-based tracking", 2003 IEEE Conf. on Computer Vision and Pattern Recog., Madison, WI, 2003.

Julier et al., "A non-divergent estimation algorithm in the presence of unknown correlations", Proc. American Control Conf., Alberqueque, NM, 1997, pp. 2369-2373.

Singh et al., "Image-flow computation: an estimation-theoretic framework and a unified perspective", CVGIP: Image Understanding 56, 1992, pp. 152-177.

Lucas et al., "An iterative image registration technique with application to stereo vision", Int'l Joint Conf. on Artificial Intelligence, Vancouver, Canada, 1981, pp. 674-679.

D. Comaniciu. "Density Estimation-based Information Fusion for Multiple Motion Computation", IEEE Workshop on Motion and Video Computing, Orlando, Florida, 2002.

Zhou XS et al, An Information Fusion Framework for Robust Shape Tracking. *Workshop on Statistical and Computational Theories of Vision SCTV*, Oct. 12, 2003, pp. 1-24.

Georgescu B et al, "Multi-model Component-Based Tracking Using Robust Information Fusion", *Statistical Methods in Video Processing*, ECCV 2004 Workshop SMVP 2004, Revised Selected Papers (Lecture Notes in Computer Science vol. 3247), Springer-Verlag Berlin, Germany, 2004, pp. 61-70.

Georgescu B et al, "Real-Time Multi-model Tracking of Myocardium in Echocardiography Using Robust Information Fusion", *Medical Image Computing and Computer-Assisted Intervention—MICCAI 2004*, 7th International Conference Proceedings (Lecture Notes in Comput. Sci. vol. 3217) Springer-Verlag Berlin, Germany, vol. 2, 2004, pp. 777-785.

Comaniciu D Ed, "Nonparametric Information Fusion for Motion Estimation", *Proceedings 2003 IEEE Conference on Computer Vision and Pattern Recognition*, CVPR 2003, Madison, WI, Jun. 18-20, 2003, Proceedings of the IEEE Computer Conference on Computer Vision and Pattern Recognition, Los Alamitos, CA, IEEE Comp. Soc., US, vol. 2 of 2, Jun. 18, 2003, pp. 59-66.

Black M J et al, "The Robust Estimation of Multiple Motions: Parametric and Piecewise-Smooth Flow Fields", *Computer Vision and Image Understanding*, Academic Press, US, vol. 63, No. 1, Jan. 1996, pp. 75-104.

Search Report including Notification of Transmittal of the International Search Report, International Search Report, and Written Opinion of the International Searching Authority.

* cited by examiner

METHOD AND SYSTEM FOR MULTI-MODAL COMPONENT-BASED TRACKING OF AN OBJECT USING ROBUST INFORMATION FUSION

CROSS REFERENCE TO RELATED APPLICATION

This application claims the benefit of U.S. Provisional Application Ser. No. 60/546,232, filed on Feb. 20, 2004, which is incorporated by reference in its entirety.

FIELD OF THE INVENTION

The present invention is directed to a system and method for tracking the motion of an object, and more particularly, to a system and method for multi-modal component-based tracking of an object using robust information fusion.

BACKGROUND OF THE INVENTION

One problem encountered in visually tracking objects is the ability to maintain a representation of target appearance that has to be robust enough to cope with inherent changes due to target movement and/or camera movement. Methods based on template matching have to adapt the model template in order to successfully track the target. Without adaptation, tracking is reliable only over short periods of time when the appearance does not change significantly.

However, in most applications, for long time periods the target appearance undergoes considerable changes in structure due to change of viewpoint, illumination or occlusion. Methods based on motion tracking where the model is adapted to the previous frame, can deal with such appearance changes. However, accumulated motion error and rapid visual changes make the model drift away from the tracked target. Tracking performance can be improved by imposing object specific subspace constraints or maintaining a statistical representation of the model. This representation can be determined a priori or computed online. The appearance variability can be modeled as a probability distribution function which ideally is learned online.

An intrinsic characteristic of the vision based tracking is that the appearance of the tracking target and the background are inevitably changing, albeit gradually. Sine the general invariant features for robust tracking are hard to find, most of the current methods need to handle the appearance variation of the tracking target and/or background. Every tracking scheme involves a certain representation of the two dimensional (2D) image appearance of the object, even though this is not mentioned explicitly.

One known method using a generative model containing three components: the stable component, the wandering component and the occlusion component. The stable component identifies the most reliable structure for motion estimation and the wandering component represents the variation of the appearance. Both are shown as Gaussian distributions. The occlusion component accounting for data outliers is uniformly distributed on the possible intensity level. The method uses the phase parts of the steerable wavelet coefficients as features.

Object tracking has many applications such as surveillance applications or manufacturing line applications. Object tracking is also used in medical applications for analyzing myocardial wall motion of the heart. Accurate analysis of the myocardial wall motion of the left ventricle is crucial for the evaluation of the heart function. This task is difficult due to the fast motion of the heart muscle and respiratory interferences. It is even worse when ultrasound image sequences are used.

Several methods have been proposed for myocardial wall tracking. Model-based deformable templates, Markov random fields, optical flow methods and combinations of these methods have been applied for tracking the left ventricle from two dimensional image sequences. It is common practice to impose model constraints in a shape tracking framework. In most cases, a subspace model is suitable for shape tracking, since the number of modes capturing the major shape variations is limited and usually much smaller than the original number of feature components used to describe the shape. A straightforward treatment is to project tracked shapes into a Principal Component Analysis (PCA) subspace. However, this approach cannot take advantage of the measurement uncertainty and is therefore not complete. In many instances, measurement noise is heteroscedastic in nature (i.e., both anisotropic and inhomogeneous). There is a need for an object tracking method that can fuse motion estimates from multiple-appearance models and which can effectively take into account uncertainty.

SUMMARY OF THE INVENTION

The present invention is directed to a system and method for tracking an object is disclosed. A video sequence including a plurality of image frames are received. A sample based representation of object appearance distribution is maintained. An object is divided into one or more components. For each component, its location and uncertainty with respect to the sample based representation are estimated. Variable-Bandwidth Density Based Fusion (VBDF) is applied to each component to determine a most dominant motion. The motion estimate is used to determine the track of the object.

The present invention is also directed to a method for tracking a candidate object in a medical video sequence comprising a plurality of image frames. The object is represented by a plurality of labeled control points. A location and uncertainty for each control point is estimated. Multiple appearance models are maintained. Each control point is compared to one or more models. A VBDF estimator is used to determine a most likely current location of each control point. Coordinates are concatenated for all of the control points. The set of control points are fused with a model that most closely resemble the set of control points.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
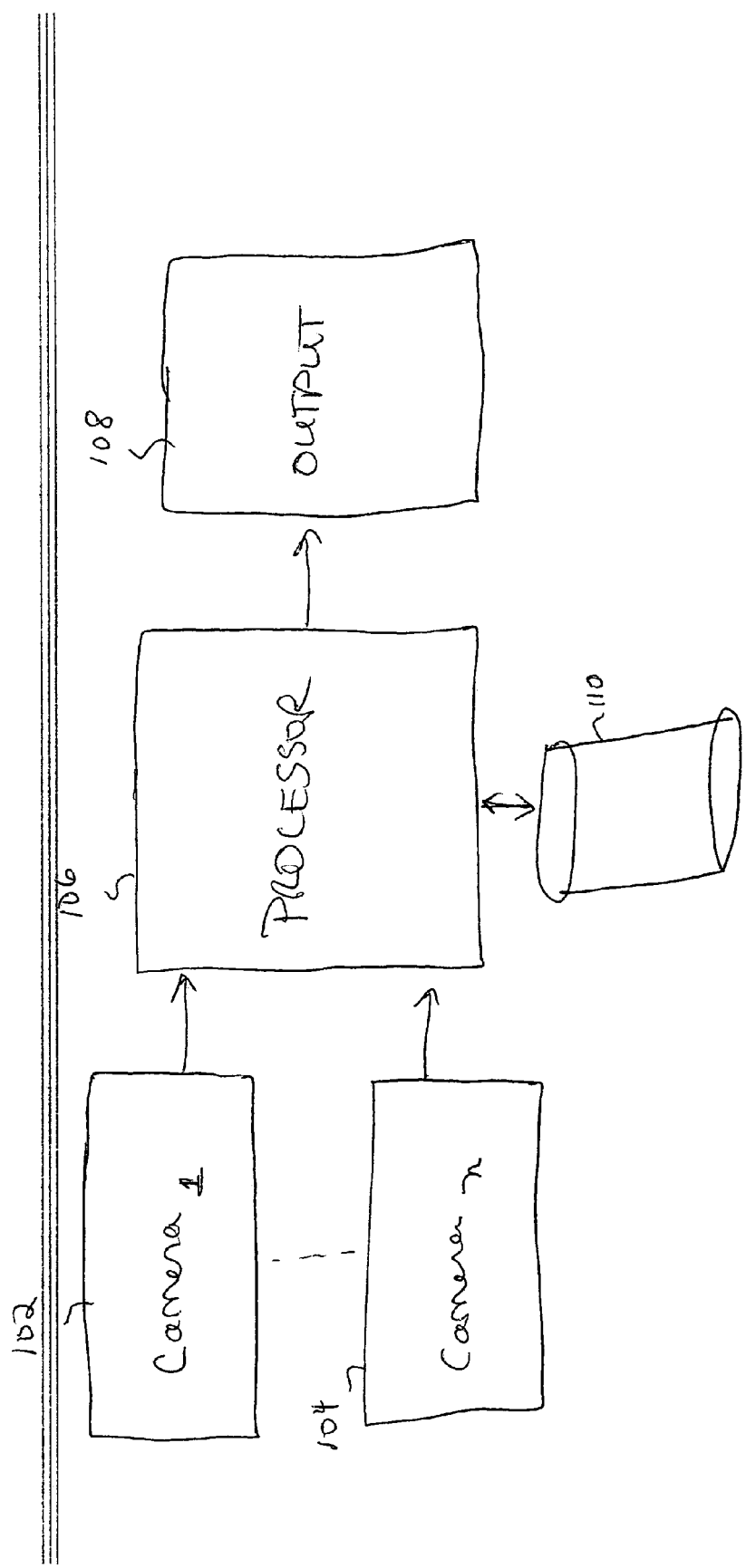
FIG. 1 is a system block diagram of a system for tracking the motion of an object in accordance with the present invention.

The present invention is directed to a system and method for tracking the motion of an object. FIG. 1 illustrates an exemplary high level block diagram of a system for multi-model component-based tracking of an object using robust information fusion in accordance with the present invention. Such a system may, for example, be used for surveillance applications, such as for tracking the movements of a person or facial features. The present invention could also be used to track objects on an assembly line. Other applications could be created for tracking human organs for medical applications. It is to be understood by those skilled in the art that the present invention may be used in other environments as well.

The present invention uses one or more cameras 102, 104 to obtain video sequences of image frames. Each camera may be positioned in different locations to obtain images from different perspectives to maximize the coverage of a target area. A target object is identified and its attributes are stored in a database 110 associated with a processor 106 For example, if a target (for example a person) is directly facing camera 102, the person would appear in a frontal view. However, the image of the same person captured by camera 104 might appear as a profile view. This data can be further analyzed to determine if further action needs to be taken. The database 110 may contain examples of components associated with the target to help track the motion of the object. A learning technique such as boosting may be employed by a processor 106 to build classifiers that are able to discriminate the positive examples from negative examples.

In accordance with one embodiment of the present invention, appearance variability is modeled by maintaining several models over time. Appearance modeling can be done by monitoring intensities of pixels over time. Over time, appearance of an object (e.g., its intensity) changes over time. These changes in intensity can be used to track control points such as control points associated with an endocardial wall. This provides a nonparametric representation of the probability density function that characterizes the object appearance.

A component based approach is used that divides the target object into several regions which are processed separately. Tracking is performed by obtaining independently from each model a motion estimate and its uncertainty through optical flow. A robust fusion technique, known as Variable Bandwidth Density Fusion (VBDF) is used to compute the final estimate for each component. VBDF computes the most significant mode of the displacements density function while taking into account their uncertainty.

The VBDF method manages multiple data sources and outliers in the motion estimates. In this framework, occlusions are naturally handled through the estimate uncertainty for large residual errors. The alignment error is used to compute the scale of the covariance matrix of the estimate, therefore reducing the influence of unreliable displacements.

Figure 2:
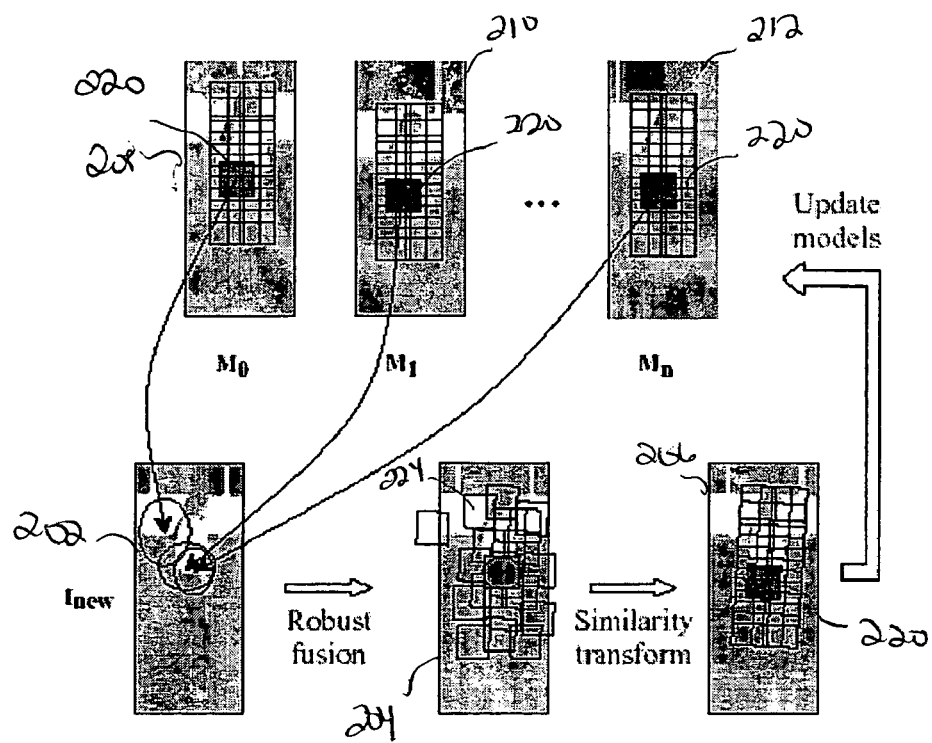
FIG. 2 illustrates the method for tracking an object using a multi-model component based tracker in accordance with the present invention.

FIG. 2 illustrates a method for tracking an object using a multi-model component-based tracker in accordance with the present invention. To model changes during tracking, several exemplars of an object appearance are maintained over time. The intensities of each pixel in each image are maintained which is equivalent to a nonparametric representation of the appearance distribution.

The top row in FIG. 2 illustrates the current exemplars 208, 210, 212 in the model set, each having associated a set of overlapping components. A component-based approach is more robust than a global representation, being less sensitive to illumination changes and pose. Another advantage is that partial occlusion can be handled at the component level by analyzing the matching likelihood.

Each component is processed independently; its location and covariance matrix is estimated in the current image with respect to all of the model templates. For example, one of the components 220 as illustrated by the gray rectangle for the image frame 202 and its location and uncertainty with respect to each model is shown in $I_{new}$. The VBDF robust fusion procedure is applied to determine the most dominant motion (i.e., mode) with the associated uncertainty as shown in rectangle 204. Note the variance in the estimated location of each component due to occlusion or appearance change. The location of the components in the current frame 206 is further constrained by a global parametric motion model. A similarity transformation model and its parameters are estimated using the confidence score for each component location. Therefore, the reliable components contribute more to the global motion estimation.

The current frame 206 is added to the model set 208, 210, 212 if the residual error to the reference appearances is relatively low. The threshold is chosen such that images are not added that have significant occlusion. The number of templates in the model is fixed, therefore the oldest is discarded. However, it is to be understood by those skilled in the art that other schemes can be used for determining which images to maintain in the model set.

The VBDF estimator is based on nonparametric density estimation with adaptive kernel bandwidths. The VBDF estimator works well in the presence of outliers of the input data because of the nonparametric estimation of the initial data distribution while exploring its uncertainty. The VBDF estimator is defined as the location of the most significant mode of the density function. The mode computation is based on using a variable bandwidth mean shift technique in a multiscale optimization framework.

Let $x_i \in R^d$, $i=1 \ldots n$ be the available d-dimensional estimates, each having an associated uncertainty given by the covariance matrix $C_i$. The most significant mode of the density function is determined iteratively in a multiscale fashion. A bandwidth matrix $H_i = C_i + \alpha^2 I$ is associated with each point $x_i$ where I is the identity matrix and the parameter α determines the scale of the analysis. The sample point density estimator at location x is defined by $$\hat{f}(x) = \frac{1}{n(2\pi)^{d/2}} \sum_{i=1}^{n} \exp\left(-\frac{1}{2}D^2(x, x_i, H_i)\right) \quad (1)$$

where D represents the Mahalanobis distance between x and $x_i$ $$D^2(x, x_i, H_i) = (x-x_i)^T H_i^{-1}(x-x_i) \quad (2)$$

The variable bandwidth mean shift vector at location x is given by $$m(x) = H_h(x) \sum_{i=1}^{n} w_i(x) H_i^{-1} x_i - x \quad (3)$$

where $H_h$ represents the harmonic mean of the bandwidth matrices weighted by the data-dependent weights $w_i(x)$ $$H_h(x) = \left(\sum_{i=1}^{n} w_i(x) H_i^{-1}\right)^{-1} \quad (4)$$

The data dependent weights computed at the current location x have the expression $$w_i(x) = \frac{\frac{1}{|H_i|^{1/2}} \exp\left(-\frac{1}{2}D^2(x, x_i, H_i)\right)}{\sum_{i=1}^{n} \frac{1}{|H_i|^{1/2}} \exp\left(-\frac{1}{2}D^2(x, x_i, H_i)\right)} \quad (5)$$

and note that it satisfies $\Sigma_{i=1}^{n} \omega_i(x) = 1$.

It can be shown that the density corresponding to the point x+m(x) is always higher or equal to the one corresponding to x. Therefore, iteratively updating the current location using the mean shift vector yields a hill-climbing procedure which converges to a stationary point of the underlying density.

The VBDF estimator finds the most important mode by iteratively applying the adaptive mean shift procedure at several scales. It starts from a large scale by choosing the parameter α large with respect to the spread of the points $x_i$. In this case, the density surface is unimodal therefore the determined mode will correspond to the globally densest region. The procedure is repeated while reducing the value of the parameter α and starting the mean shift iterations from the mode determined at the previous scale. For the final step, the bandwidth matrix associated to each point is equal to the covariance matrix, i.e., $H_i = C_i$.

The VBDF estimator is a powerful tool for information fusion with the ability to deal with multiple source models. This is important for motion estimation as points in a local neighborhood may exhibit multiple motions. The most significant mode corresponds to the most relevant motion.

In accordance with the present invention, multiple component models are tracked at the same time. An example of how the multiple component models are tracked will now be described. It is assumed that there are n models $M_0, M_1, \ldots, M_n$. For each image, c components are maintained with their location denoted by $x_{i,j}$, i=1 . . . c, j=1 . . . n. When a new image is available, the location and the uncertainty for each component and for each model are estimated. This step can be done using several techniques such as ones based on image correlation, spatial gradient or regularization of spatio-temporal energy. In accordance with the present invention a robust optical flow technique is used which is described in D. Comaniciu, "Nonparametric information fusion for motion estimation", CVPR 2003, Vol. 1, pp. 59–66 which is incorporated by reference.

The result is the motion estimate $x_{i,j}$ for each component and its uncertainty $C_{i,j}$. Thus $x_{i,j}$ represents the location estimate of component j with respect to model i. The scale of the covariance matrix is also estimated from the matching residual errors. This will increase the size of the covariance matrix when the respective component is occluded; therefore occlusions are handled at the component level.

The VBDF robust fusion technique is applied to determine the most relevant location $x_j$ for component j in the current frame. The mode tracking across scales results in $$\hat{x}_j = C(\hat{x}_j) \sum_{i=1}^{n} w_i(\hat{x}_j) \hat{C}_{ij}^{-1} \hat{x}_{ij} \quad (6)$$

$$C(\hat{x}_j) = \left(\sum_{i=1}^{n} w_i(\hat{x}_j) \hat{C}_{ij}^{-1}\right)^{-1}$$

with the weights $\omega_i$ defined as in (5).

Following the location computation of each component, a weighted rectangle fitting is carried out with the weights given by the covariance matrix of the estimates. It is assumed that the image patches are related by a similarity transform T defined by four parameters. The similarity transform of the dynamic component location x is characterized by the following equations.

$$T(x) = \begin{pmatrix} a & -b \\ b & a \end{pmatrix} x + \begin{pmatrix} t_x \\ t_y \end{pmatrix} \quad (7)$$

where $t_x$, $t_y$ are the translational parameters and a, b parameterize the 2D rotation and scaling.

The minimized criterion is the sum of Mahalanobis distances between the reference location $x_j^0$ and the estimated ones $x_j$ ($j^{th}$ component location in the current frame).

$$J = \sum_{j=1}^{c} (\hat{x}_j - T(x_j^0))^T C(\hat{x}_j)^{-1} (\hat{x}_j - T(x_j^0)). \quad (8)$$

Minimization is done through standard weighted least squares. Because the covariance matrix for each component is used, the influence of points with high uncertainty is reduced.

After the rectangle is fitted to the tracked components, the dynamic component candidate is uniformly resampled inside the rectangle. It is assumed that the relative position of each component with respect to the rectangle does not change a lot. If the distance of the resample position and the track position computed by the optical flow of a certain component is larger than a tolerable threshold, the track position is regarded as an outlier and replaced with the resampled point. The current image is added to the model set if sufficient components have low residual error. The median residual error between the models and the current frame is compared with a predetermined threshold $T_h$.

Figure 3:
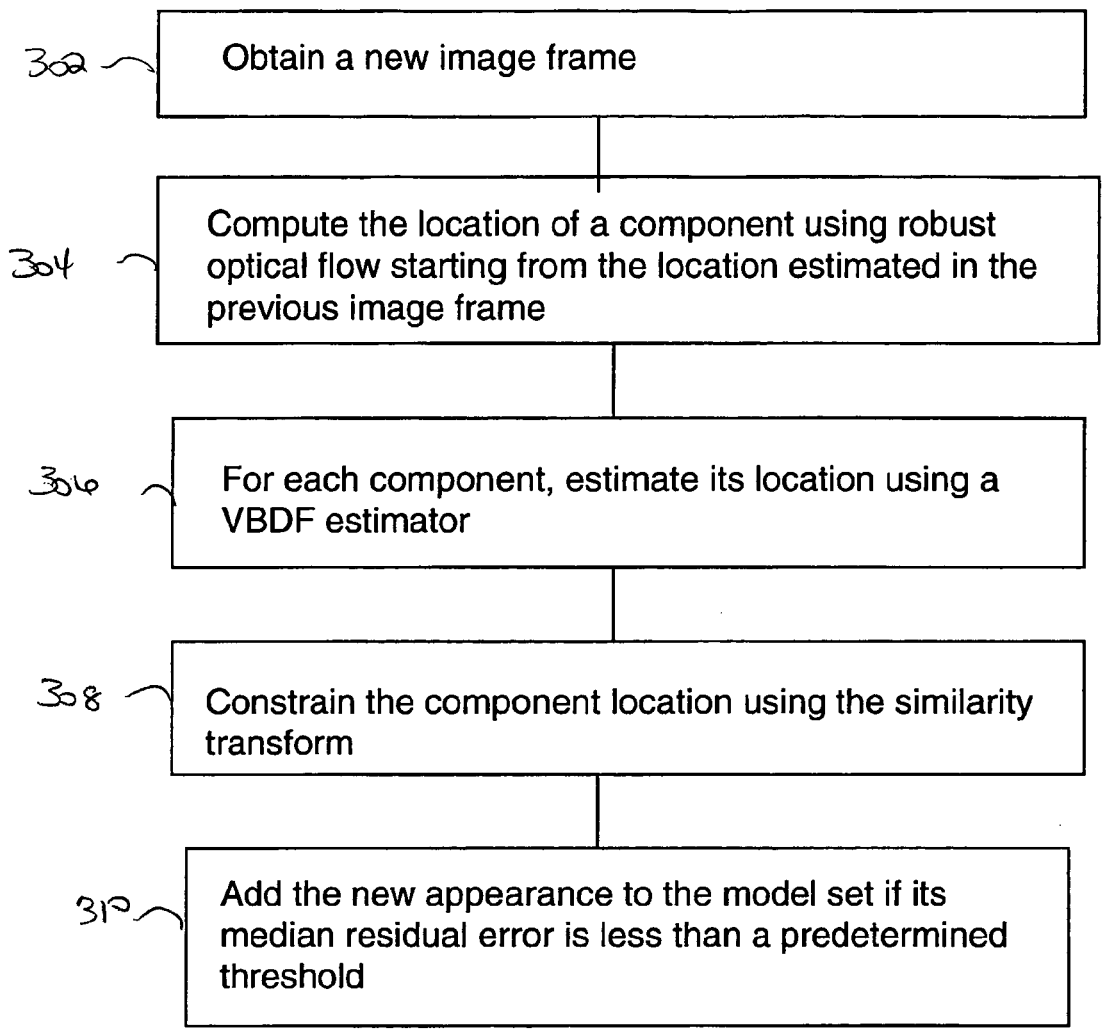
FIG. 3 is a flow chart that sets forth a method for tracking an object in accordance with the present invention.

A summary of the method for object tracking will now be described with reference to FIG. 3. As indicated above a set of models $M_0, M_1, \ldots, M_n$ for a component i are obtained for a new image $I_f$ (step 302). Component i is in a location $x_{i,j}$ in image frame j. For a new image $I_f$ locations for component i are computed at location $x_{i,j}^{(f)}$ in image frame j using an optical flow technique. Computations start at $x_j^{(f-1)}$ which is the location of component i that was estimated in the previous frame (step 304). For a sequence of image frames (j=1 . . . n ) the location $x_j^{(f)}$ of component i is estimated using the VBDF estimator (step 306). The component location is constrained using the transform computed by minimizing eq. (8) (step 308). The new appearance is added to the model set if its median residual error is less than the predetermined threshold $T_h$ (step 310).

The multi-template framework of the present invention can be directly applied in the context of shape tracking. If the tracked points represent the control points of a shape modeled by splines, the use of the robust fusion of multiple position estimates increases the reliability of the location estimate of the shape. It also results in smaller corrections when the shape space is limited by learned subspace constraints. If the contour is available, the model templates used for tracking can be selected online from the model set based on the distance between shapes.

Figure 4:
FIG. 4 shows a sequence of image frames in which a human face is tracked in accordance with the method of the present invention.

An example of an application of the method of the present invention will now be described with reference to FIG. 4. FIG. 4 shows face tracking results over a plurality of image frames in which significant clutter and occlusion were present. In the present example, 20 model templates were used and the components are at least 5 pixels distance with their number c determined by the bounding rectangle. The threshold $T_h$ for a new image to be added to the model set was one-eighth of the intensity range. The value was learned from the data such that occlusions are detected.

Figure 5:
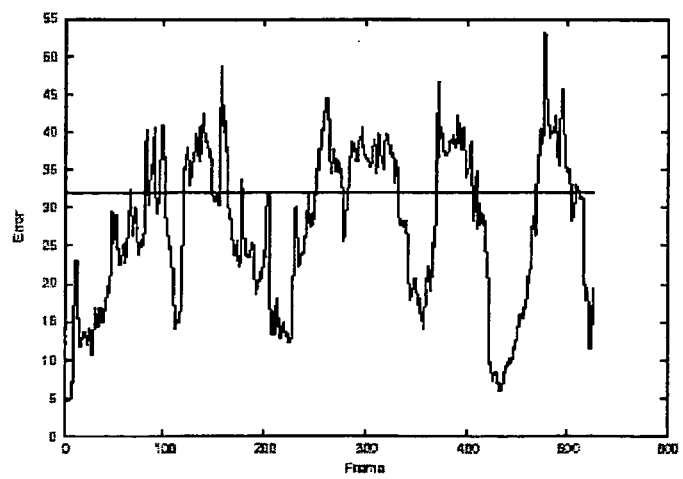
FIG. 5 illustrates a graph showing the median residual error for the face tracking images of FIG. 4.

As can be seen from the image frames in FIG. 4, there is significant clutter by the presence of several faces. In addition, there are multiple occlusions (e.g., papers) which intercept the tracked region. FIG. 5 shows a graph representing the median residual error over time which is used for model updates. The peaks in the graph correspond to image frames where the target is completely occluded. The model update occurs when the error passes the threshold $T_h=32$ which is indicated by the horizontal line.

Figure 6:
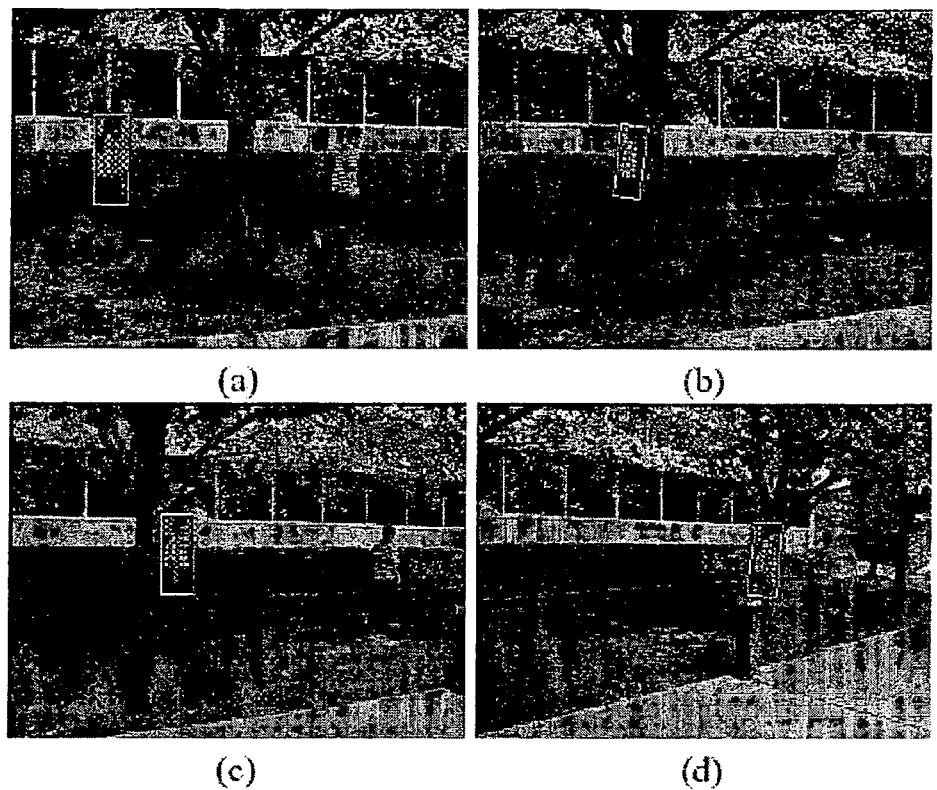
FIG. 6 shows a sequence of image frames in which a human body is being tracked in accordance with the present invention.
Figure 7:
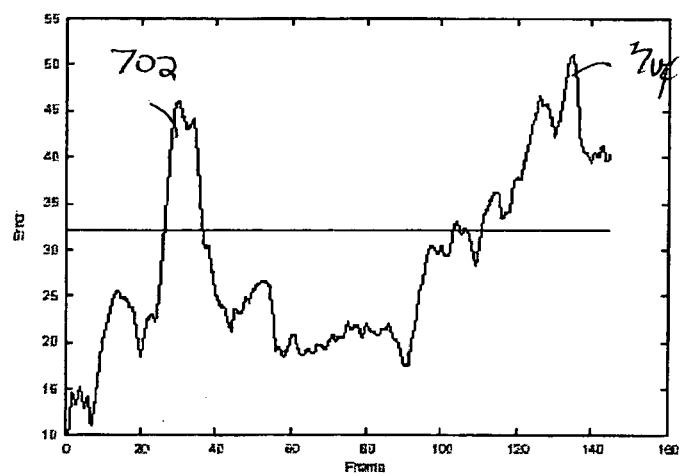
FIG. 7 illustrates a graph showing the median residual error for the body tracking images of FIG. 6.

FIG. 6 shows a plurality of image frames used to track a human body in accordance with the present invention. The present invention is able to cope with appearance changes such as a person's arm moving and is able to recover the tracking target (i.e., body) after being occluded by a tree. FIG. 7 is a graph that shows the median residual error over time. Peak 702 corresponds to when the body is occluded by the tree while peak 704 represents when the body is turned and its image size becomes smaller with respect to the fixed component size.

Figure 8:
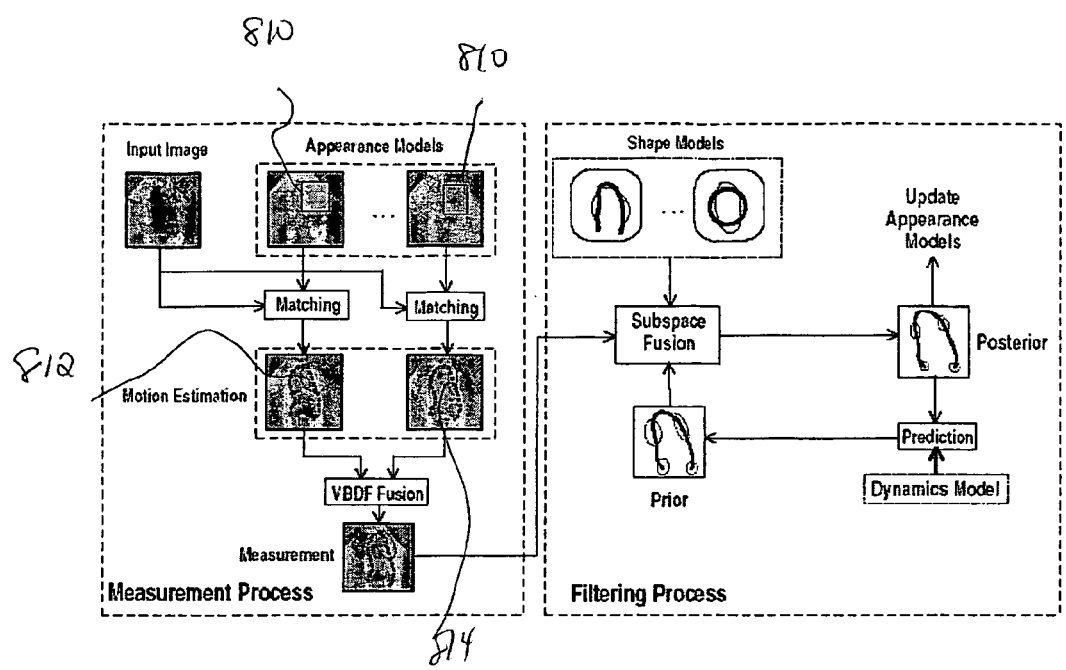
FIG. 8 illustrates a block diagram of a robust tracker that uses measurement and filtering processing in accordance with the present invention.

The method of the present invention can also be used in medical applications such as the tracking of the motion of the endocardial wall in a sequence of image frames. FIG. 8 illustrates how the endocardial wall can be tracked. The method of the present invention is robust in two aspects: in the measurement process, VBDF fusion is used for combining matching results from multiple appearance models, and in the filtering process, fusion is performed in the shape space to combine information from measurement, prior knowledge and models while taking advantage of the heteroscedastic nature of the noise.

To model the changes during tracking, several exemplars of the object appearance are maintained over time which is equivalent to a nonparametric representation of the appearance distribution. FIG. 8 illustrates the appearance models, i.e., the current exemplars in the model set, each having associated a set of overlapping components. Shapes, such as the shape of the endocardial wall, are represented by control or landmark points (i.e., components). The points are fitted by splines before shown to the user. A component-based approach is more robust than a global representation, being less sensitive to structural changes thus being able to deal with non-rigid shape deformation.

Each component is processed independently, its location and covariance matrix is estimated in the current image with respect to to all of the model templates. For example, one of the components is illustrated by rectangle 810 and its location and uncertainty with respect to each model is shown in the motion estimation stage as loops 812 and 814. The VBDF robust fusion procedure is applied to determine the most dominant motion (mode) with the associated uncertainty.

The location of the components in the current frame is further adapted by imposing subspace shape constraints using pre-trained shape models. Robust shape tracking is achieved by optimally resolving uncertainties from the system dynamics, heteroscedastic measurements noise and subspace shape model. By using the estimated confidence in each component location reliable components contribute more to the global shape motion estimation. The current frame is added to the model set if the residual error to the reference appearance is relatively low.

Figure 9:
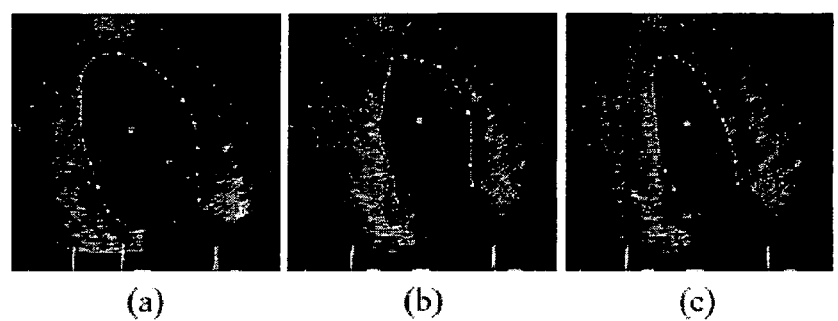
FIG. 9 illustrates a number of image frames that demonstrate the results of using a single model versus multiple model tracking method.

FIG. 9 shows the advantage of using multiple appearance models. The initial frame with the associated contour is shown in FIG. 9a. Using a single model yields an incorrect tracking result (FIG. 9b) and the multiple model approach correctly copes with the appearance changes (FIG. 9c).

The filtering process is based on vectors formed by concatenating the coordinates of all the control points in an image. A typical tracking framework fuses information from the prediction defined by a dynamic process and from noisy measurements. For shape tracking, additional global constraints are necessary to stabilize the overall shape in a feasible range.

For endocardium tracking a statistical shape model of the current heart instead of a generic heart is needed. A strongly-adapted Principal Control Analysis (SA-PCA) model is applied by assuming that the PCA model and the initialized contour jointly represent the variations of the current case. With SA-PCA, the framework incorporates four information sources: the system dynamic, measurement, sub-space model and the initial contour.

Figure 10:
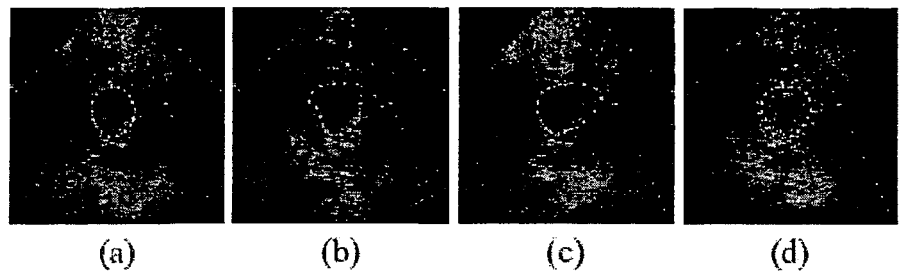
FIG. 10 is a series of image frames that illustrate a comparison of the fusion approach of the present invention versus an orthogonal projection approach.

An example is shown in FIG. 10 for comparison between the fusion method of the present invention and an orthogonal projection method. The fusion method does not correct the error completely, but because the correction step is cumulative, the overall effect at a later image frame in a long sequence can be very significant.

The following describes an example of the present invention being used to track heart contours using very noisy echocardiography data. The data used in the example represent normals as well as various types of cardiomyopathies, with sequences varying in length from 18 frames to 90 frames. Both apical two- or four-chamber views (open contours with 17 control points) and parasternal short axis views (closed contour with 18 control points) for training and testing were used. PCA was performed and the original dimensionality of 34 and 36 was reduced to 7 and 8, respectively. For the appearance models, 20 templates are maintained to capture the appearance variability. For systematic evaluation, a set of 32 echocardiogram sequences outside of the training data for testing, with 18 parasternal short axis views and 14 apical two- or four-chamber views, all with expert annotated ground truth contours.

Figure 11:
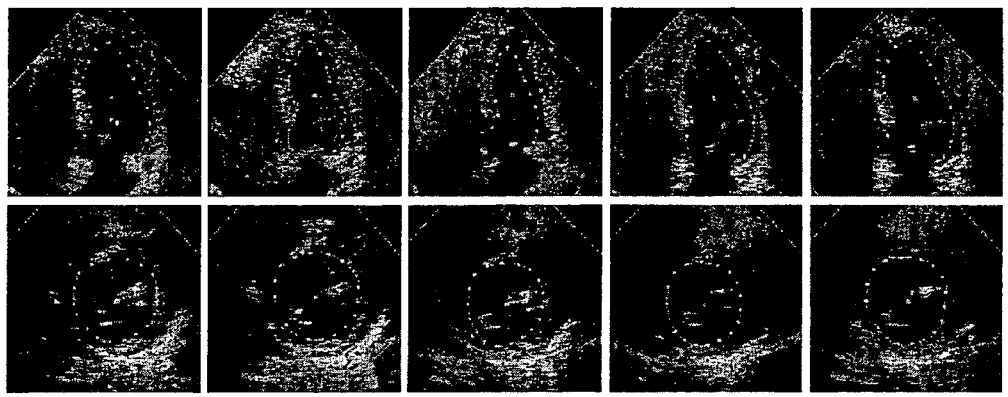
FIG. 11 illustrates a series of image frames that exemplify two sets of image sequences obtained from using the fusion method in accordance with the present invention.
Figure 12:
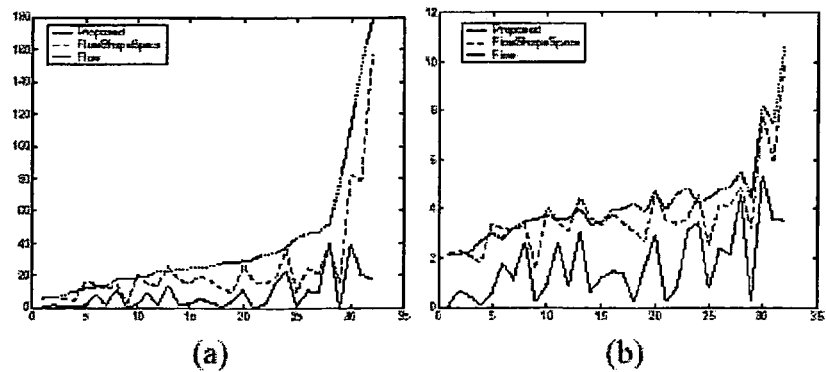
FIG. 12 is a graph that illustrates the mean distances between tracked points and the ground truth in accordance with the present invention.

FIG. 11 shows snapshots from two tracked sequences. It can be seen that the endocardium is not always on the strongest edge. Sometimes it manifests itself only by a faint line; sometimes it is completely invisible or buried in heavy noise; sometimes it will cut through the root of the papillary muscles where no edge is present. To compare performance of different methods, the Mean Sum of Squared Distance (MSSD) and a Mean Absolute Distance (MAD) are used. The method of the present invention is compared to a tracking algorithm without shape constraint (referred to as Flow), and a tracking algorithm with orthogonal PCA shape space constraints (referred to as FlowShapeSpace). FIG. 12 shows the comparison using the two distance measures. The present invention significantly outperforms the other two methods, with lower average distances and lower standard deviations for such distances.

Having described embodiments for a method for tracking an object using robust information fusion, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for tracking an object comprising the steps of:
   receiving a video sequence comprised of a plurality of image frames;
   maintaining a sample based nonparametric representation of object appearance distribution, each sample acquired at a different time instance during object tracking or any past object appearance instance;
   dividing an object into one or more components for each image frame;
   for each object component, estimating its motion measurement and uncertainty with respect to the sample based representation;
   computing fused motion estimates by robustly fusing all motion measurements and uncertainties for each object component to determine a most dominant motion; and
   using the fused motion estimates to determine the track of the object in subsequent image frames.

2. The method of claim 1 wherein the tracking of the object is performed on each subsequent image frame containing the object, each subsequent image frame being representative of a different time instance.

3. The method of claim 1 wherein the relative location of the components can be constrained using global parametric motion.

4. The method of claim 1 wherein the residual error associated with the components motion measurement is measured relative to model templates.

5. The method of claim 4 wherein if the residual error is below a predetermined threshold, the current frame is added to the model templates.

6. The method of claim 5 wherein a high residual error indicates that the object is at least partially occluded.

7. The method of claim 5 wherein a high residual error indicates that the object is affected by a change in illumination conditions.

8. The method of claim 1 wherein the object being tracked is a face.

9. The method of claim 1 wherein the object being tracked is a human body.

10. The method of claim 1 wherein the sample based representation of object appearance distribution comprises model templates obtained from past object appearance instances of the image frames.

11. The method of claim 1 wherein the sample based representation of object appearance distribution comprises model templates obtained during object tracking of the image frames.

12. The method of claim 1 wherein the relative location of the components can be constrained using a shape model.

13. The method of claim 1 wherein the step of computing fused motion estimates uses Variable Bandwidth Density based Fusion.

14. A method for tracking a candidate object in a medical video sequence comprising a plurality of image frames, the object being represented by a plurality of labeled control points in each image frame, each control point being acquired at a different time instance during object tracking or any past object appearance instance the method comprising the steps of:
   estimating motion measurement and uncertainty for each control point;
   maintaining multiple appearance models;
   comparing each control point to one or more models;
   using a VBDF estimator to determine a most likely current location of each control point in a given image frame;
   concatenating coordinates for all of the control points;
   fusing the set of control points with a model that most closely resemble the set of control points; and
   using the fused set of control points to determine the track of the object in subsequent image frames.

15. The method of claim 14 wherein the control points are associated with a contour of an endocardial wall.

16. The method of claim 15 wherein the method tracks deformable motion of the endocardial wall.

17. A system for tracking an object comprising:
   at least one camera for capturing a video sequence of image frames;
   a processor associated with the at least one camera, the processor performing the following steps:
   i). maintaining a sample based nonparametric representation of object appearance distribution, each sample acquired at a different time instance during object tracking or any past object appearance instance;
   ii). dividing an object into one or more components for each image frame;
   iii). for each object component, estimating its motion measurement and uncertainty with respect to the sample based representation;
   iv). computing fused motion estimates by robustly fusing all motion measurements and uncertainty for each object component to determine a most dominant motion; and v). using the fused motion estimate to determine the track of the object in subsequent image frames.

18. The system of claim 17 wherein the tracking of the object is performed on each subsequent image frame containing the object, each subsequent image frame being representative of a different time instance.

19. The system of claim 17 wherein the relative location of the components can be constrained using global parametric motion.

20. The system of claim 17 wherein the residual error associated with the components motion measurement is measured relative to model templates.

21. The system of claim 20 wherein if the residual error is below a predetermined threshold, the current frame is added to the model templates.

22. The system of claim 21 wherein a high residual error indicates that the object is at least partially occluded.

23. The system of claim 21 wherein a high residual error indicates that the object is affected by a change in illumination conditions.

24. The system of claim 17 wherein the object being tracked is a face.

25. The system of claim 17 wherein the object being tracked is a human body.

26. The system of claim 17 wherein the sample based representation of object appearance distribution comprises model templates obtained from past object appearance instances of the image frames.

27. The system of claim 17 wherein the sample based representation of object appearance distribution comprises model templates obtained during object tracking of the image frames.

28. The system of claim 17 wherein the relative location of the components can be constrained using a shape model.

29. The method of claim 17 wherein the step of computing fused motion estimates uses Variable Bandwidth Density based Fusion.

* * * * *